United States Patent
Pritchard

(10) Patent No.: US 10,099,553 B2
(45) Date of Patent: Oct. 16, 2018

(54) HYDRAULIC MODE-STABLE POWERTRAIN TRANSFER CASE

(71) Applicant: BorgWarner Inc., Auburn Hills, MI (US)

(72) Inventor: Larry A. Pritchard, Macomb, MI (US)

(73) Assignee: BORGWARNER INC., Auburn Hills, MI (US)

( * ) Notice: Subject to any disclaimer, the term of this patent is extended or adjusted under 35 U.S.C. 154(b) by 301 days.

(21) Appl. No.: 15/190,309

(22) Filed: Jun. 23, 2016

(65) Prior Publication Data

US 2017/0001518 A1 Jan. 5, 2017

Related U.S. Application Data

(60) Provisional application No. 62/187,312, filed on Jul. 1, 2015.

(51) Int. Cl.
| | |
|---|---|
| *B60K 17/344* | (2006.01) |
| *B60K 17/35* | (2006.01) |
| *B60K 23/08* | (2006.01) |
| *F16H 37/06* | (2006.01) |

(52) U.S. Cl.
CPC ............ *B60K 17/344* (2013.01); *B60K 17/35* (2013.01); *B60K 23/08* (2013.01); *B60K 23/0808* (2013.01); *B60K 2023/0858* (2013.01); *B60Y 2400/406* (2013.01)

(58) Field of Classification Search
CPC ........ F16H 37/06; B60K 17/344; B60K 17/35
See application file for complete search history.

(56) References Cited

U.S. PATENT DOCUMENTS

| | | | | |
|---|---|---|---|---|
| 4,821,591 A | * | 4/1989 | Adler | F16H 3/54 192/53.34 |
| 5,697,861 A | * | 12/1997 | Wilson | B60K 17/3462 180/249 |
| 5,704,867 A | * | 1/1998 | Bowen | B60K 17/3462 475/205 |
| 6,022,289 A | * | 2/2000 | Francis | B60K 17/3467 475/204 |
| 6,283,887 B1 | | 9/2001 | Brown et al. | |
| 6,354,977 B1 | | 3/2002 | Brown et al. | |
| 6,398,688 B2 | | 6/2002 | Brown et al. | |
| 6,458,056 B1 | | 10/2002 | Brown et al. | |

(Continued)

*Primary Examiner* — Ha Dinh Ho
(74) *Attorney, Agent, or Firm* — Howard & Howard Attorneys PLLC

(57) ABSTRACT

A transfer case (26) for translating rotational torque from an engine (22) to first and second differentials (34, 36). A primary shaft (50) is supported in a housing (48) and has an input in communication with the engine (22) and an output in communication with the first differential (34). A secondary shaft (52) is disposed in communication with the second differential (36). A clutch (54) selectively translates torque between the shafts (50, 52) and moves between a first position (54A) wherein torque is translated to the secondary shaft (52), and a second position (54B) wherein torque is interrupted. An actuator (64) with a piston (68) movably supported in a cylinder (66) moves the clutch (54). A lock (70) moves between a locked configuration (70A) engaging the piston (68) to prevent the clutch (54) from moving, and an unlocked configuration (70B) releasing the piston (68) allowing the clutch (54) to move.

17 Claims, 8 Drawing Sheets

(56) References Cited

U.S. PATENT DOCUMENTS

| | | | |
|---|---|---|---|
| 6,464,612 B2 * | 10/2002 | Frost | B60K 17/3467 |
| | | | 180/248 |
| 6,554,731 B2 | 4/2003 | Brown et al. | |
| 6,997,299 B2 | 2/2006 | Brissenden et al. | |
| 7,021,445 B2 | 4/2006 | Brissenden et al. | |
| 7,059,462 B2 | 6/2006 | Brissenden et al. | |
| 7,201,266 B2 | 4/2007 | Brissenden et al. | |
| 7,294,086 B2 | 11/2007 | Brissenden et al. | |
| 8,888,658 B2 | 11/2014 | Pritchard | |

* cited by examiner

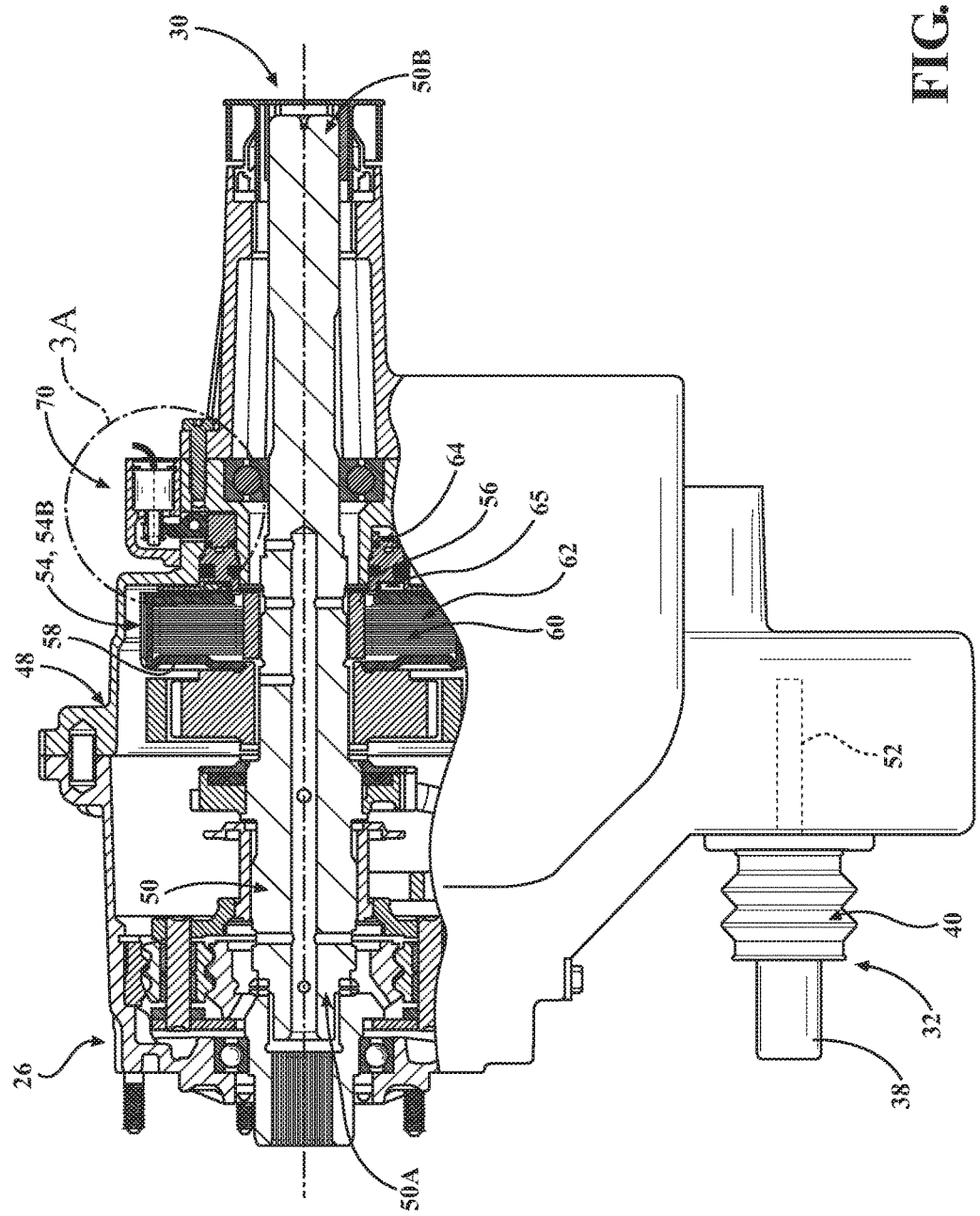

HYDRAULIC MODE-STABLE POWERTRAIN TRANSFER CASE

CROSS REFERENCE TO RELATED APPLICATIONS

This application claims the benefit of U.S. provisional patent application entitled "Hydraulic Mode-Stable Powertrain Transfer Case," having Ser. No. 62/187,312, and filed on Jul. 1, 2015.

BACKGROUND OF INVENTION

1. Field of Invention

The present invention relates, generally, to automotive powertrain systems and, more specifically, to a hydraulic mode-stable powertrain transfer case.

2. Description of the Related Art

Conventional automotive vehicles known in the art include a powertrain system in rotational communication with one or more drivelines used to drive the vehicle in operation. Typically, the vehicle includes a pair of drivelines, each defined by a respective pair of opposing wheels. The powertrain system includes a propulsion system adapted to generate and selectively translate rotational torque to one or more of the wheels so as to drive the vehicle. To that end, in conventional automotive powertrain systems, the propulsion system is typically realized as an internal combustion engine in rotational communication with a transmission. The engine generates rotational torque which is selectively translated to the transmission which, in turn, translates rotational torque to one or more of the drivelines. The transmission multiplies the rotational speed and torque generated by the engine through a series of predetermined gear sets, whereby changing between gear sets enables the vehicle to travel at different vehicle speeds for a given engine speed.

In so-called "four-wheel-drive" or "all-wheel-drive" powertrain systems, both drivelines may be used to drive the vehicle. To that end, all wheel drive powertrain systems typically include a transfer case disposed in rotational communication with the transmission and adapted to split rotational torque between the drivelines. The transfer case may be spaced from the transmission, or may be integrated with the transmission. Where the transfer case is spaced from the transmission, a driveshaft is used to translate rotational torque from the transmission to the transfer case. Driveshafts are also typically used to connect the transfer case to each respective driveline. Conventional drivelines are typically realized by a differential assembly adapted to receive rotational torque from the transfer case and subsequently split rotational torque between opposing wheels. To that end, each driveline also typically includes a pair of continuously-variable joints disposed in torque translating relationship with the differential and each respective opposing wheel.

Depending on the specific configuration of the powertrain system, the percentage of torque split between the drivelines may vary. Moreover, depending on the vehicle application, the transfer case and/or driveline(s) may be configured to selectively interrupt rotational torque to one of the drivelines under certain operating conditions. Specifically, the powertrain system may be configured such that the vehicle can be selectively operated in "two-wheel-drive" or in "four-wheel-drive". Moreover, the powertrain system may be configured to automatically and continuously control how much rotational torque is sent to each driveline. Thus, the powertrain system may be configured to send a higher percentage of available torque to one of the drivelines under certain vehicle operating conditions, and a lower percentage of available torque to the same driveline under different vehicle operating conditions. By way of non-limiting example, the powertrain system may be configured such that 80% of available torque is sent to a front driveline and 20% of available torque is sent to a rear driveline until there is a loss of traction or wheel spin, whereby the powertrain subsequently adjusts torque split such that 50% of available torque is sent to each driveline.

Depending on the vehicle application, rotational torque may only be required at both drivelines relatively infrequently. Thus, the vehicle may be designed to operate primarily in "two-wheel-drive" so as to minimize parasitic loss and optimize powertrain system efficiency, or may be selectable between "two-wheel-drive" and "four-wheel-drive" by the vehicle operator, as noted above. Irrespective of the type of vehicle powertrain system employed, it is desirable for the powertrain be configured as "mode stable," whereby the transfer case is configured to maintain or otherwise remain in a selected operating mode upon vehicle shut-down, which may occur intentionally (such as when the vehicle is parked and the operator keys-off or otherwise exits the vehicle) or unintentionally (such as caused by an electrical system failure or inadvertent keying-off of the ignition during vehicle operation). As such, it will be appreciated that powertrain system mode stability is desirable both when the vehicle is parked and when the vehicle is moving. By way of non-limiting example, if the vehicle were parked on a steep incline and left in four-wheel-drive operating mode, ab inadvertent switching to two-wheel-drive could cause the vehicle to subsequently roll down the incline. This scenario is particularly problematic where the transfer case utilizes one or more hydraulically-actuated clutch assemblies to effect changing between operating modes, as hydraulic clutch assemblies inherently relinquish holding force over time due to bleed down (seal leakage).

Each of the components and systems of the types described above must cooperate to effectively facilitate selective translation of rotational torque to the driven wheels of the vehicle. In addition, each of the components and systems must be designed not only to facilitate improved performance and efficiency, but also so as to reduce the cost and complexity of manufacturing vehicles. While powertrain systems known in the related art have generally performed well for their intended use, there remains a need in the art for a hydraulic mode-stable powertrain transfer case that has superior operational characteristics, and, at the same time, that reduces the cost and complexity of manufacturing vehicles that operate with high efficiency under a number of different driving conditions.

SUMMARY OF THE INVENTION

The present invention overcomes the disadvantages in the related art in a transfer case for translating rotational torque from an engine to first and second differentials of a vehicle. The transfer case includes a housing and a primary shaft rotatably supported in the housing. The primary shaft has an input end in rotational communication with the engine, and an output end in rotational communication with the first differential. A secondary shaft is disposed in rotational communication with the second differential, and a clutch assembly is operatively connected between the primary shaft and the secondary shaft for selectively translating rotational torque therebetween. The clutch assembly is selectively movable between a first position wherein rotational torque is translated to the secondary shaft, and a second position wherein rotational torque is interrupted to the secondary shaft. The transfer case also includes an actuator having a cylinder and a piston movably supported in the cylinder. The piston is disposed in force translating relationship with the clutch assembly such that movement of the piston along the cylinder causes corresponding movement of the clutch assembly between the first position and the second position. The transfer case further includes a lock mechanism selectively movable between a locked configuration and an unlocked configuration. In the locked configuration, the lock mechanism engages the piston and prevents movement of the piston along the cylinder thereby preventing movement of the clutch assembly between the first position and the second position. In the unlocked configuration, the lock mechanism releases the piston thereby allowing the piston to move the clutch assembly between the first position and the second position.

In this way, the hydraulic mode-stable powertrain transfer case of the present invention significantly improves the performance of vehicle powertrain systems by enabling simple and space-efficient implementation of transfer case mode stability.

More specifically, those having ordinary skill in the art will appreciate that the present invention is configured such that the lock mechanism maintains transfer case mode stability irrespective of hydraulic bleed down of the clutch assembly. Further, the present invention can be used in connection with a number of different types of powertrain systems, and in a number of different ways. Further still, the present invention reduces the cost and complexity of manufacturing vehicles that have superior operational characteristics, such as high efficiency, reduced weight, component packaging, component life, and vehicle drivability.

BRIEF DESCRIPTION OF THE DRAWINGS

Other objects, features, and advantages of the present invention will be readily appreciated as the same becomes better understood after reading the subsequent description taken in connection with the accompanying drawings wherein:

FIG. 2 is a partial sectional view of the transfer case of FIG. 1 showing portions of a clutch assembly, an actuator, and a lock mechanism.

DETAILED DESCRIPTION OF THE INVENTION

Figure 1:
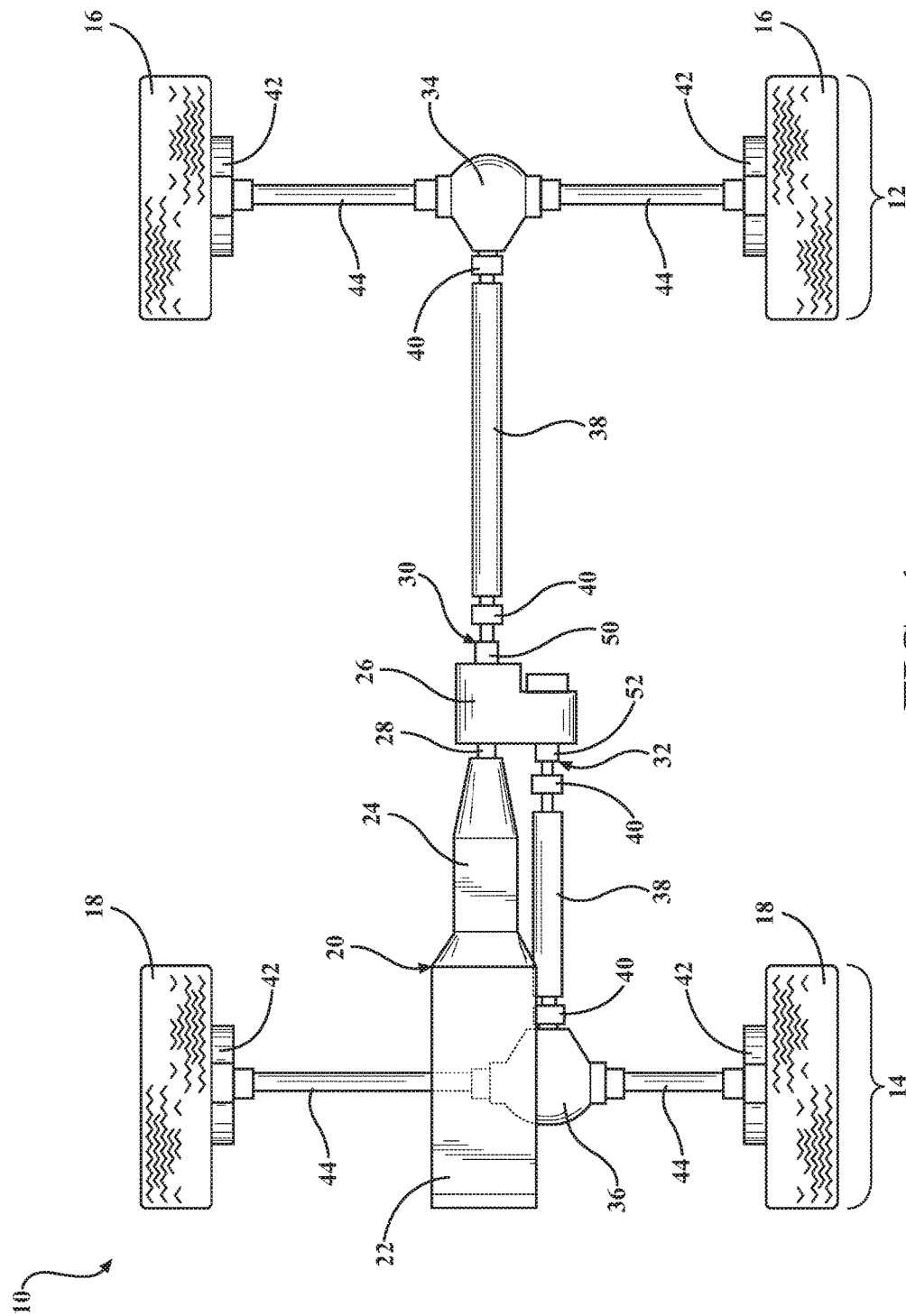
FIG. 1 is a schematic plan view of a vehicle powertrain system showing a transfer case according to one embodiment of the present invention.

Referring now to the drawings, where like numerals are used to designate like structure unless otherwise indicated, a vehicle powertrain system is schematically illustrated at 10 in FIG. 1. The powertrain system 10 includes a first driveline 12 and a second driveline 14. The first driveline 12 includes a first pair of opposing wheels 16, and the second driveline 14 includes a second pair of opposing wheels 18. Those having ordinary skill in the art will recognize this as a conventional "four wheeled" vehicle design commonly used in automotive applications. However, as will be appreciated from the subsequent discussion below, the vehicle could include any number of drivelines with any suitable number of wheels without departing from the scope of the present invention. The powertrain system 10 also includes a propulsion system 20 that acts to generate and translate rotational torque the first and second drivelines 12, 14. Each of these components and systems will be described in greater detail below.

In the representative example illustrated in FIG. 1, the propulsion system 20 is realized as a conventional internal combustion engine 22 disposed in rotational communication with a transmission 24. The engine 22 generates rotational torque which is selectively translated to the transmission 24 which, in turn, multiplies the rotational speed and torque generated by the engine 22. Those having ordinary skill in the art will appreciate that transmission 24 can be designed in several different ways and, as such, can be disposed in rotational communication with the engine 22 in any suitable way, depending on the application. By way of non-limiting example, the transmission 24 could include a gear set (not shown, but generally known in the art) that is either manually or automatically actuated, or the transmission 24 could be continuously-variable. Moreover, while FIG. 1 shows the engine 22 and transmission 24 operatively attached to one another, it will be appreciated that the transmission 24 could spaced from the engine 22, so as to improve weight distribution of the vehicle, without departing from the scope of the present invention. Further, it will be appreciated that the propulsion system 20, engine 22, and/or transmission 24 could be of any suitable type, configured in any suitable way sufficient to generate and translate rotational torque to the drivelines 12, 14, without departing from the scope of the present invention. By way of non-limiting example, the propulsion system 20 could employ what is commonly referred to in the related art as a "hybrid engine," whereby rotational torque translated to the drivelines 12, 14 is generated by the engine 22 as well as by one or more electric motors (not shown, but generally known in the art). Similarly, the powertrain system 10 could omit an internal combustion engine 22 altogether, such as in a so-called "electric vehicle powertrain" wherein the propulsion system 20 employs one or more electric motors to drive the vehicle (not shown, but generally known in the related art).

The powertrain system 10 also includes a transfer case 26 disposed in rotational communication with the transmission 24. The transfer case 26 is configured to split rotational torque from the transmission 24 between the drivelines 12, 14, as described in greater detail below. In the representative embodiment illustrated herein, the transfer case 26 is situated in-line with the transmission 24 and is disposed in rotational communication therewith via a transmission output shaft 28. However, those having ordinary skill in the art will appreciate that the transfer case 26 and transmission 24 could be disposed in rotational communication with each other in a number of different ways without departing from the scope of the present invention. By way of non-limiting example, the transfer case 26 could be integrated with the transmission 24, or the transmission 24 and transfer case 26 could be offset from one another and could be in rotational communication via an intermediate shaft with one or more universal joints (not shown, but generally known in the art), thereby enabling additional flexibility with respect to weight distribution and packaging of the drivetrain 10.

The transfer case 26 includes a first output 30 and a second output 32 disposed in torque translating relationship with the first driveline 12 and the second driveline 14, respectively. In the representative embodiment illustrated herein, each of the drivelines 12, 14 includes a respective differential assembly 34, 36, a driveshaft 38, and one or more universal joints 40. The driveshaft 38 and universal joints 40 connect the outputs 30, 32 of the transfer case 26 to the respective differentials 34, 36 of the drivelines 12, 14. Thus, the first differential assembly 34 is disposed in torque translating relationship with the first output 30 of the transfer case 26 and translates rotational torque to the first pair of wheels 16, and the second differential assembly 36 is disposed in torque translating relationship with the second output 32 of the transfer case 26 and translates rotational torque to the second pair of wheels 18. Each of the wheels 16, 18 is mounted to a respective wheel hub 42 configured to facilitate rotation in operation. In order to translate rotation to the wheels 16, 18 to drive the vehicle in operation, each of the drivelines 12, 14 also includes a pair of continuously-variable joints 44 which translate rotational torque from the differentials 34, 36 to the wheels 16, 18. However, those having ordinary skill in the art will appreciate that the drivelines 12, 14 could be configured differently, with or without the use of continuously-variable joints 44, without departing from the scope of the present invention. By way of non-limiting example, it is conceivable that the drivelines 12, 14 could be realized by live axles with integrated hubs (not shown, but generally known in the art).

As will be appreciated from the subsequent description below, the transfer case 26 could be of any suitable type or configuration sufficient to selectively translate rotational torque between the transmission 24 and the drivelines 12, 14 without departing from the scope of the present invention. In traditional "four-wheel-drive" powertrain systems 10, as illustrated in FIG. 1, the transfer case 26 translates rotational torque to the first driveline 12 when the vehicle is operated in "rear-wheel-drive mode," and the transfer case 26 translates rotational torque to both the first and second drivelines 12, 14 when the vehicle is operated in "four-wheel-drive mode". In certain applications, the vehicle operator can decide whether to operate in "two-wheel-drive" or "four-wheel-drive" and can select between the modes using an input control (not shown, but generally known in the art). Alternatively, a controller 46 (see FIGS. 3A-3B) can be used to automatically move the transfer case 26 between "two-wheel-drive" and "four-wheel-drive" without driver interaction (not shown in detail, but generally known in the art). In other applications, four-wheel-drive powertrain systems 10 may be configured as so-called "full-time all-wheel-drive" powertrain systems 10, whereby the transfer case 26 always translates at least some rotational torque to both drivelines 12, 14. The amount of torque translated to each of the drivelines 12, 14 can be allocated according to a fixed ratio, such as via predetermined gearing (not shown, but generally known in the art), or torque can be selectively (or, continuously) adjustable between the drivelines 12, 14 via one or more clutch assemblies, as described in greater detail below.

Referring now to FIG. 2, the transfer case 26 includes a housing, generally indicated at 48, in which a primary shaft 50 and a secondary shaft 52 are rotatably supported. The primary shaft 50 has an input end 50A disposed in rotational communication with the engine 22, and an output end 50B disposed in rotational communication with the first driveline 12. More specifically, the input end 50A of the primary shaft 50 is coupled to the output shaft 28 of the transmission 24, and the output end 50B of the primary shaft 50 is coupled to the first differential 34 via the driveshaft 38. The secondary shaft 52 of the transfer case 26 is spaced from the primary shaft 50 and is disposed in rotational communication with the second driveline 14. More specifically, the secondary shaft 52 is coupled to the second differential 36 via the driveshaft 38 (see FIG. 1).

As noted above, the transfer case 26 illustrated in FIG. 2 is of the type conventionally utilized in connection with "four-wheel-drive" vehicles and, thus, may utilize one or more gear trains (not shown or described in detail, but generally known in the related art) to translate torque to both drivelines 12, 14 at one or more predetermined ratios that are fixed, variable, and/or selectable. To that end, the transfer case 26 also includes a clutch assembly 54 connected between the primary shaft 50 and the secondary shaft 52 for selectively translating rotational torque therebetween. As shown in FIG. 2, the clutch assembly 54 is supported along the primary shaft 50 between the input end 50A and the output end 50B. The clutch assembly 54 includes a first hub 56 disposed in communication with the primary shaft 50, a second hub 58 disposed in torque translating relationship with the secondary shaft 52 such as by a chain and sprockets (not shown in detail, but generally known in the art), and a plurality of stacked plates 60 and discs 62.

Figure 3A:
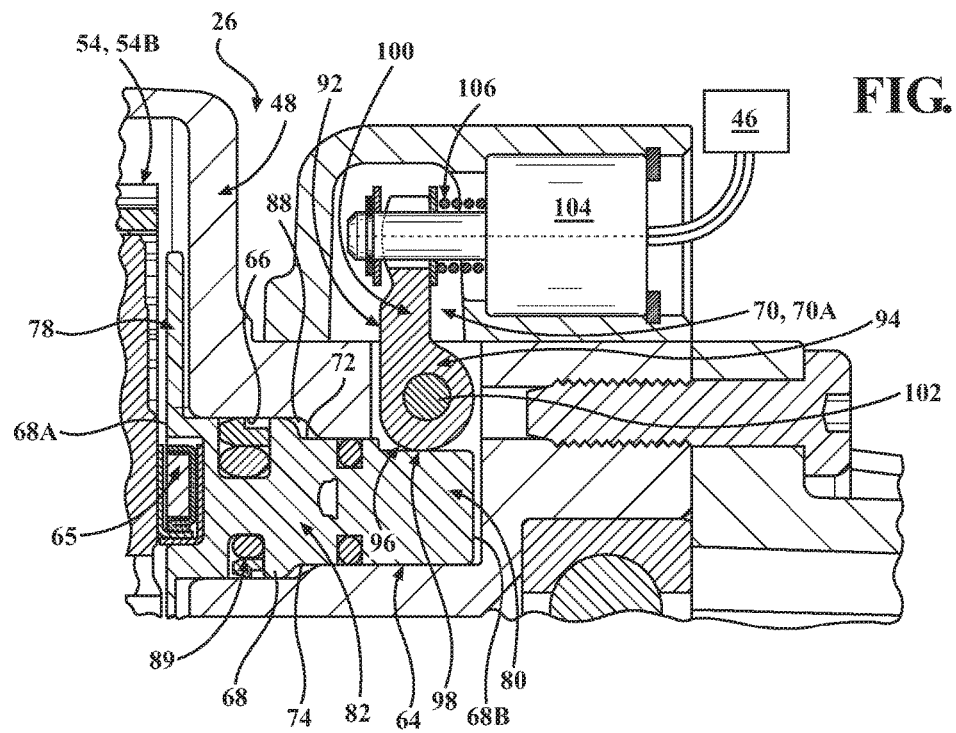
FIG. 3A is an enlarged sectional view taken along indicia 3A of FIG. 2 showing the transfer case with the clutch assembly in a first position and the lock mechanism in a locked configuration.
Figure 3B:
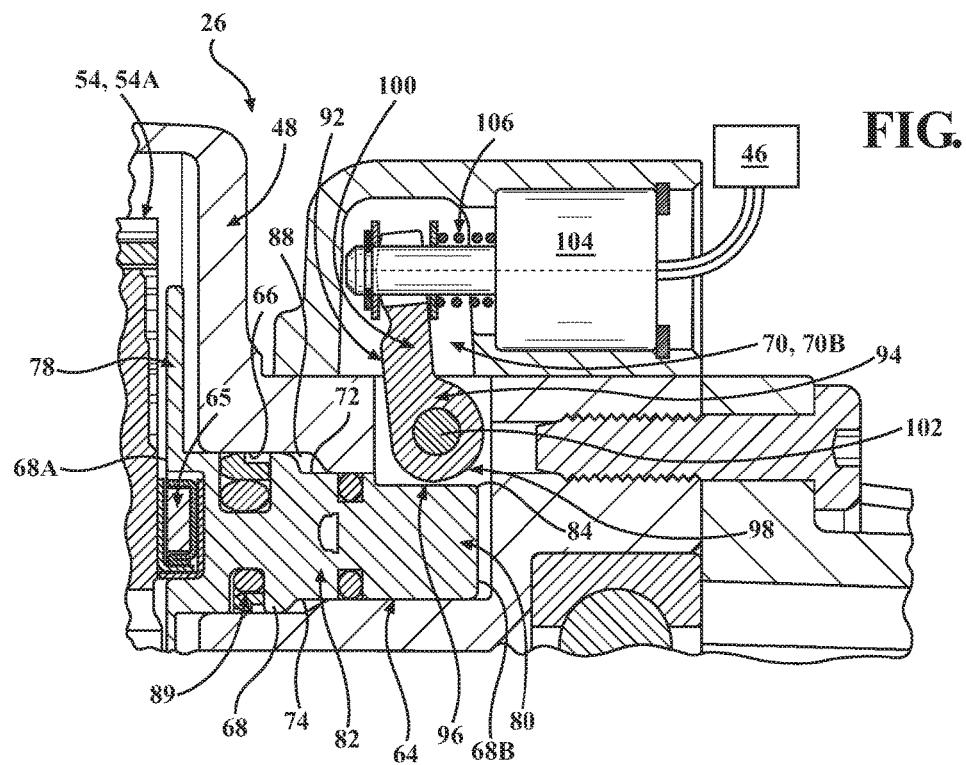
FIG. 3B is an alternate view of the transfer case of FIG. 3A showing the clutch assembly in a second position and the lock mechanism in an unlocked configuration.

The plates 60 and discs 62 of the clutch assembly 54 cooperate with the hubs 56, 58 to facilitate selective translation of rotational torque to the secondary shaft 52 and to ensure smooth engagement and disengagement therewith. More specifically, the clutch assembly 54 is selectively movable between: a first position 54A wherein rotational torque is translated to the secondary shaft 52 (see FIG. 3B), and a second position 54B wherein rotational torque is interrupted to the secondary shaft 52 (see FIG. 3A). To that end, the transfer case 26 also includes an actuator, generally indicated at 64, for moving the clutch assembly 54 between the positions 54A, 54B. As described in greater detail below, the actuator 64 is configured to selectively apply force to the clutch assembly 54 to modulate torque translation between the drivelines 12, 14, as noted above. As shown in FIGS. 2-3B, the primary shaft 50 extends through and is substantially concentrically aligned with the clutch assembly 54. Likewise, as described in greater detail below, the actuator 64 is substantially concentrically aligned with the clutch assembly 54 and is configured to translate axial force thereto in operation. To that end, a thrust bearing arrangement 65 (see FIGS. 2-3B) may be interposed between the clutch assembly 54 and the actuator 64 so as to facilitate relative rotational movement and ensure proper translation of axial force in operation (not shown in detail, but generally known in the art).

The actuator 64 has a cylinder 66 and a piston 68 movably supported in the cylinder 66. The piston 68 is disposed in force translating relationship with the clutch assembly 54 such that movement of the piston 68 along the cylinder 66 causes corresponding movement of the clutch assembly 54 between the positions 54A, 54B. Those having ordinary skill in the art will recognize the clutch assembly 54 and actuator 64 described herein as forming what is commonly referred to as a "hydraulic clutch system," whereby hydraulic pressure is used to drive the piston 68 of the actuator 64 to move the clutch assembly 54 between the positions 54A, 54B, as described in greater detail below.

The transfer case 26 also includes a lock mechanism, generally indicated at 70, that is selectively movable between: a locked configuration 70A (see FIG. 3A) wherein the lock mechanism 70 engages the piston 68 and prevents movement of the piston 68 along the cylinder 66 thereby preventing movement of the clutch assembly 54 between the positions 54A, 54B; and an unlocked configuration 70B (see FIG. 3B) wherein the lock mechanism 70 releases the piston 68 thereby allowing the piston 68 to move the clutch assembly 54 between the positions 54A, 54B. The clutch assembly 54, the actuator 64, and the lock mechanism 70 will be described in greater detail below.

The cylinder 66 of the actuator 64 is defined in the housing 48 adjacent to the clutch assembly 54 and between the ends 50A, 50B of the primary shaft 50 (see FIG. 2). The piston 68 has a substantially tube-shaped profile with an outer piston surface 72 and an inner piston surface 74 spaced from the outer piston surface 72, which facilitates efficient packaging of the actuator 64 in that the piston 68 can be disposed along (and concentric with) the primary shaft 50. More specifically, in one embodiment, the inner piston surface 74 defines a piston chamber 76 and the primary shaft 50 extends at least partially into and/or through the piston chamber 76. However, those having ordinary skill in the art will appreciate that the piston 68 could have any suitable shape, profile, or configuration without departing from the scope of the present invention.

As shown in FIGS. 3A-3B, the piston 68 extends longitudinally between a first piston end 68A adjacent the clutch assembly 54, and a second piston end 68B adjacent to the lock mechanism 70. In one embodiment, the piston 68 includes a flange portion 78 at the first piston end 68A for engaging and translating force to the clutch assembly 54, and an end portion 80 at the second piston end 68B for cooperating with the lock mechanism 70, as described in greater detail below. In one embodiment, the piston 68 has a stepped mid-portion 82 extending between the flange portion 78 and the end portion 80 (see FIGS. 3A-3B). In one embodiment, the end portion 80 of the piston 68 also includes at least one flat 84 for facilitating engagement with the lock mechanism 70, as described in greater detail below. In the embodiment illustrated in FIG. 4, the end portion 80 of the piston 68 includes three radially-spaced flats 84 for cooperating with three corresponding lock mechanisms 70, as described in greater detail below. However, as will be appreciated from the subsequent description below, those having ordinary skill in the art will appreciate that the piston 68 could have any suitable shape, configuration, or profile sufficient to translate force to the clutch assembly 54, without departing from the scope of the present invention.

As noted above, the piston 68 of the actuator 64 moves the clutch assembly 54 between positions 54A, 54B using pressurized hydraulic fluid. To that end, as shown schematically in FIGS. 5A-5B, the transfer case 26 includes a pump assembly, generally indicated at 86, for providing a source of fluid power to the actuator 64. Specifically, a portion 88 of the cylinder 66 of the actuator 64 is disposed in selective fluid communication with the pump assembly 86 for moving the piston 68 along the cylinder 66 so as to correspondingly move the clutch assembly 54 between the positions 54A, 54B, as discussed above. In order to help prevent hydraulic fluid from bleeding from the portion 88 to other parts of the transfer case 26, the piston 68 may include one or more grooves supporting rings or seals, generally indicated at 89, which cooperate with the cylinder 66 of the actuator 64 (or with the housing 48) to ensure proper operation of the actuator 64 and the hydraulic systems. Those having ordinary skill in the art will appreciate that the portion 88 of the cylinder 66 can be defined in a number of different ways depending on the specific configuration of the housing 48 and the piston 68. Moreover, those having ordinary skill in the art will appreciate that the pump assembly 86 could be of any suitable type or configuration, and could be driven in any suitable way, without departing from the scope of the present invention. By way of non-limiting example, the pump assembly 86 could be a georotor pump driven by an electric motor (not shown, but generally known in the art).

Figure 5A:
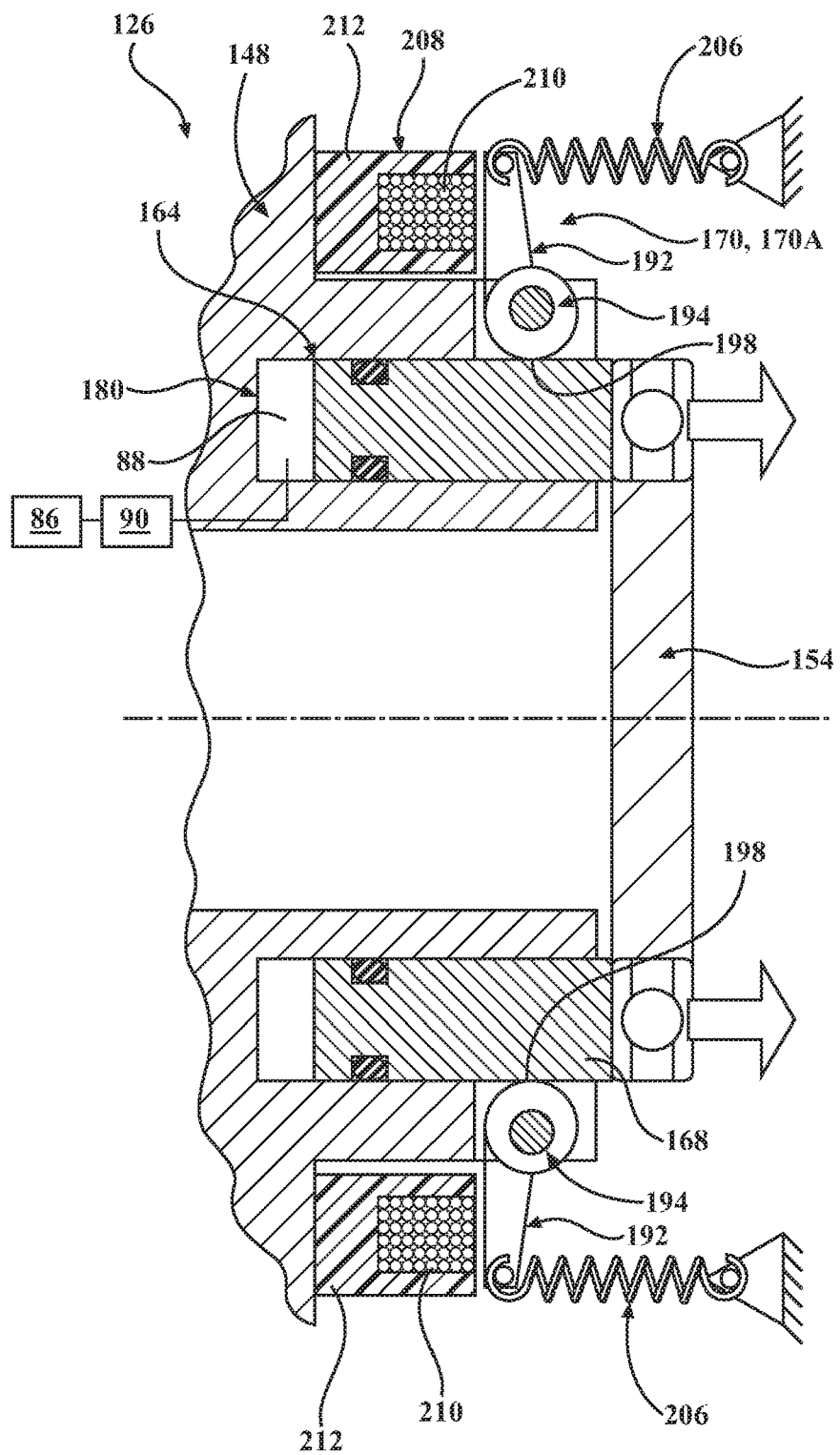
FIG. 5A is a diagrammatic representation of a portion of a transfer case with an actuator and lock mechanism in a locked configuration according to one embodiment of the present invention.
Figure 5B:
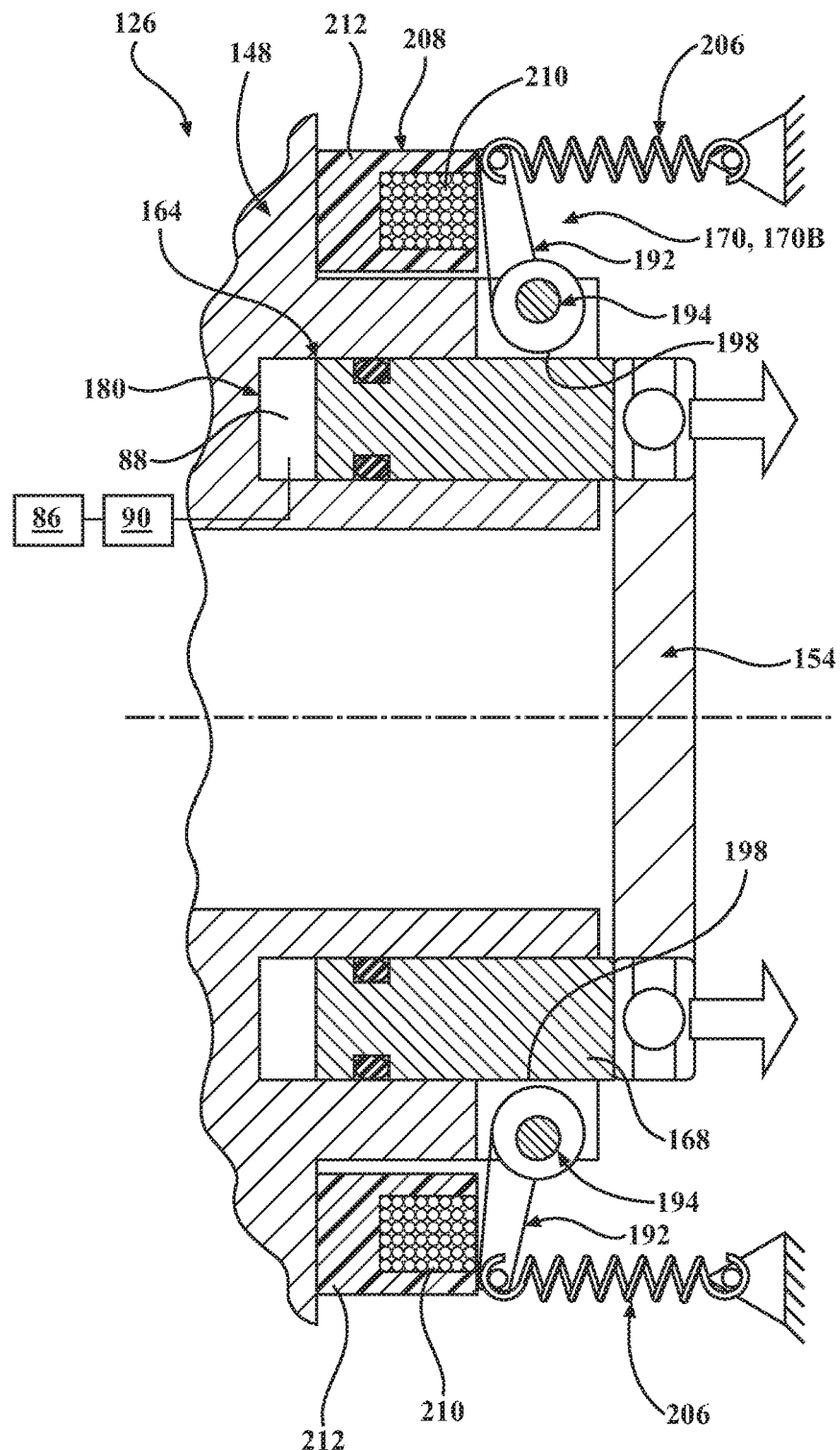
FIG. 5B is an alternate diagrammatic representation of the portion of the transfer case of FIG. 5A with the lock mechanism in an unlocked configuration.

In one embodiment, the transfer case 26 includes a control valve, schematically indicated at 90 in FIGS. 5A-5B, interposed in fluid communication between the portion 88 of the cylinder and the pump assembly 86. The control valve 90 may be used to selectively control the flow of or otherwise direct hydraulic fluid to the actuator 64 so as to effect selective control of the clutch assembly 54 between the positions 54A, 54B, as discussed above. Those having ordinary skill in the art will appreciate that the control valve 90 could be of any suitable type or configuration, and could be controlled in any suitable way, without departing from the scope of the present invention. By way of non-limiting example, the control valve 90 could be disposed in electrical communication with and driven by the controller 46, such as by wires (not shown in detail, but generally known in the art).

As noted above, the transfer case 26 of the present invention includes a lock mechanism 70 that cooperates with the actuator 64 so as to facilitate mode stability of the clutch assembly 54 between the first position 54A and the second position 54B. More specifically, the lock mechanism 70 effectively holds the clutch assembly 54 in one of the positions 54A, 54B when in the locked configuration 70A irrespective of bleeding down of hydraulic pressure in the clutch assembly 54 over time, as noted above. Further, in one embodiment, the piston 68 of the actuator 64 holds the clutch assembly 54 in a locked position 54C between the first position 54A and the second position 54B when the lock mechanism 70 is in the locked configuration 70A. Thus, it will be appreciated that the lock mechanism 70 can maintain mode stability of the clutch assembly 54 at the first position 54A, at the second position 54B, or at any suitable locked position 54C between the first and second positions 54A, 54B. By way of non-limiting example, if the transfer case 26 of the present invention were implemented as a so-called "all wheel drive" system with the first position 54A representing 90% of available torque to the first driveline 12 and 10% of available torque to the second driveline 14 and with the second position 54B representing 50% of available torque to the first driveline 12 and 10% of available torque to the second driveline 14, then the locked position 54C could represent 70% of available torque to the first driveline 12 and 30% of available torque to the second driveline 14. However, those having ordinary skill in the art will appreciate that the locked position 54C could be defined in any suitable way without departing from the scope of the present invention.

Figure 4:
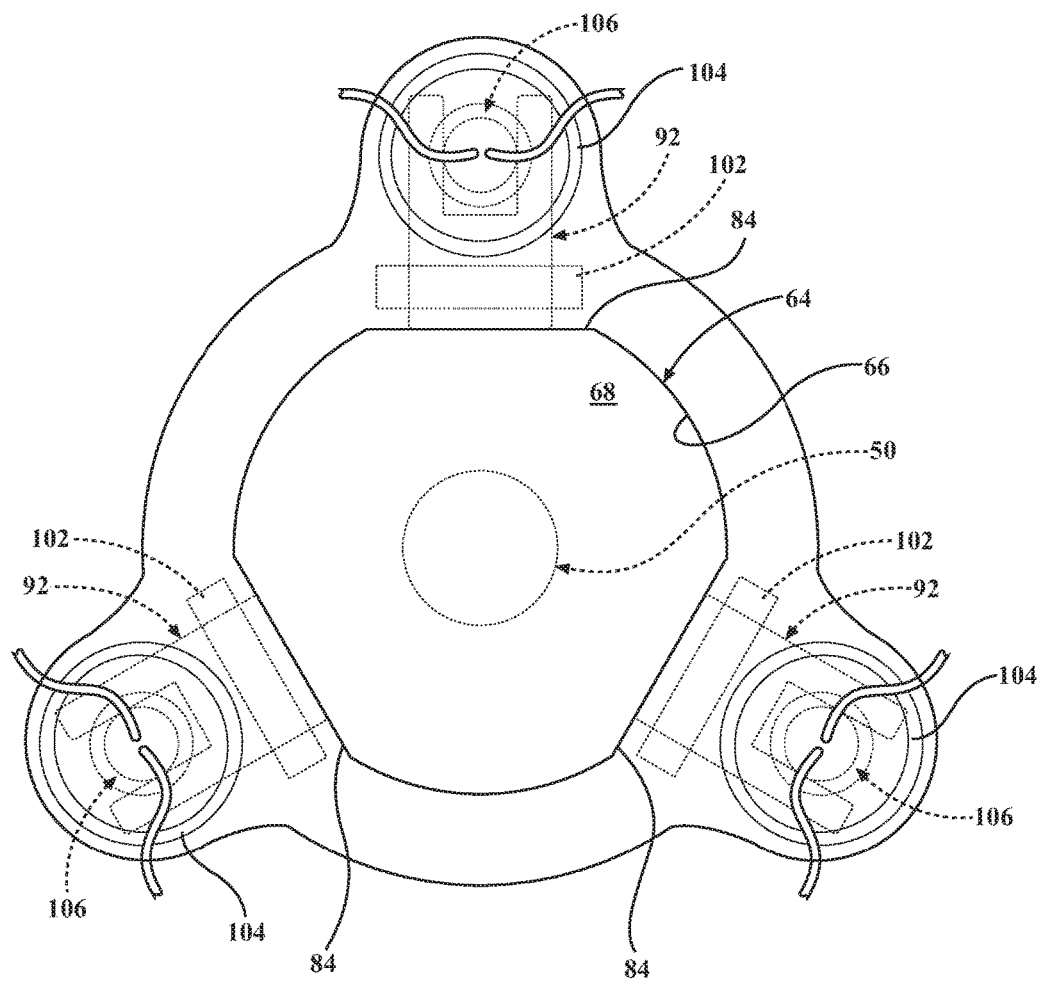
FIG. 4 is a transverse view of a portion of the actuator of FIG. 2 shown with a plurality of flats and a corresponding plurality of lock mechanisms.

It will be appreciated that the lock mechanism 70 and/or actuator 64 can be configured in a number of different ways, depending on the vehicle application. By way of non-limiting example, three different embodiments of the of the lock mechanism 70 of the transfer case 26 of the present invention are described herein. For the purposes of clarity and consistency, unless otherwise indicated, subsequent discussion of the lock mechanism 70 will refer to a first embodiment, as illustrated in FIGS. 2-4.

As best shown in FIGS. 3A-3B, the lock mechanism 70 may include a pawl 92 having a cam portion 94. The cam portion 94 of the pawl 92 at least partially engages the piston 68 of the actuator 64 when the lock mechanism 70 is in the locked configuration 70A so as to prevent movement of the piston 68 along the cylinder 66. More specifically, the cam portion 94 of the pawl 92 engages the flat 84 of the end portion 80 of the piston 68. As noted above, in one embodiment, the transfer case 26 may include a plurality of lock mechanisms 70 that cooperate so as to selectively hold the piston 68 of the actuator 64 and thereby prevent the clutch assembly 54 from moving between the first position 54A and the second position 54B when the lock mechanism 70 is in the locked configuration 70A. Thus, in this embodiment, each lock mechanism 70 includes a respective pawl 92 with a cam portion 94 that engages an assigned flat 84 of the end portion 80 of the piston 68, as discussed above. As shown best in FIG. 4, in one embodiment, three lock mechanism 70 and three respective flats 84 are utilized. The lock mechanisms 70 are radially spaced about the primary shaft 50 of the transfer case 26 and are equally spaced from each other (see FIG. 4). This arrangement facilitates symmetric engagement of the piston 68 and, at the same time, enables flexibility with respect to how the lock mechanisms 70 are manufactured, arranged, and assembled. However, those having ordinary skill in the art will appreciate that any suitable number of lock mechanism 70 could be utilized, arranged or otherwise configured in any suitable way sufficient to facilitate mode stability of the clutch assembly 54, as discussed above, without departing from the scope of the present invention.

In one embodiment, the cam portion 94 of the pawl 92 has a low point 96 and a high point 98, with the high point 98 arranged with respect to the low point 96 such that the high point 98 engages the piston 68 of the actuator 64 only when the lock mechanism 70 is in the locked configuration 70A (see FIG. 3A). In one embodiment, the pawl 92 further includes a lever portion 100 extending from and merging with the cam portion 94. The pawl 92 may be pivotally attached to the housing 48 between the cam portion 94 and the lever portion 100, such as by a pivot 102 operatively attached to the housing 48. In one embodiment, the lock mechanism 70 includes a solenoid 104 coupled to the lever portion 100 of the pawl 92 and operatively attached to the housing 48 for selectively translating force to the pawl 92 so as to effect movement of the lock mechanism 70 between the configurations 70A, 70B, as discussed above. The solenoid 104 may be disposed in electrical communication with and actuated by the controller 46 so as to move the lock mechanism 70 between the configurations 70A, 70B. In one embodiment, a biasing mechanism, generally indicated at 106, is provided for urging the lever portion 100 of the pawl 92 away from the solenoid 104 when the lock mechanism 70 is in the locked configuration 70A. Those having ordinary skill in the art will appreciate that, depending on the specific configuration of the solenoid 104, the biasing mechanism 106 could also be configured so as to urge the lever portion 100 of the pawl 92 toward the solenoid 104. As shown in FIGS. 3A-3B, the biasing mechanism 106 may be supported in the housing 48 and/or operatively attached to the solenoid 104 and/or the pawl 92 for concurrent movement therewith. In one embodiment, the biasing mechanism 106 includes at least one compression spring operatively attached to the lever portion 100.

As noted above, a second embodiment of the lock mechanism 70 of the transfer case 26 of the present invention is shown schematically in FIGS. 5A-5B. While specific differences between the embodiments will be described in greater detail below, in the description that follows, like components and structure of the second embodiment of the lock mechanism 70 and transfer case 26 are provided with the same reference numerals used in connection with the first embodiment increased by 100.

Referring now to FIGS. 5A-5B, the second embodiment of the lock mechanism 170 and transfer case 126 of the present invention is shown schematically. In this embodiment, the piston 168 of the actuator 164 has a substantially annular profile with the portion 88 defined adjacent to the end-portion 180 and the housing 148. In this embodiment, the lock mechanism 170 utilizes an electromagnet, generally indicated at 208, to move between configurations 170A, 170B so as to facilitate mode-stability of the clutch assembly 154. The electromagnet 208 includes a toroidal coil 210 supported in a mount 212 which, in turn, is operatively attached to the housing 148. In the representative embodiment illustrated herein, the electromagnet 208 surrounds the piston 168, thereby facilitating efficient component packaging and a reduced overall size of the transfer case 126. When activated, such as by the controller 46, the electromagnet 208 moves the lock mechanism 170 from the locked configuration 170A (see FIG. 5A) to the unlocked configuration 170B (see FIG. 5B) so that the piston 168 can apply force (represented with arrows in FIGS. 5A-5B) to the clutch assembly 154 to move between positions, as described above in connection to the first embodiment. To that end, when the lock mechanism 170 is in the unlocked configuration 170B, magnetic forces generated by the electromagnet 208 urge a pair of pawls 192 toward the coil 210 to counteract force from respective biasing mechanisms 206. Here, the high point 198 of the cam portion 194 of the pawls 192 is positioned adjacent to and spaced from the piston 168 when the electromagnet 208 is activated (see FIG. 5B). Similarly, when the electromagnet 208 is deactivated, the biasing mechanisms 206 urge the pawls 192 away from the coil 210 such that the high points 198 of the cam portion 194 of the pawls 192 abut the piston 168, thereby preventing the clutch assembly 154 from moving between the positions (see FIG. 5A).

Figure 6A:
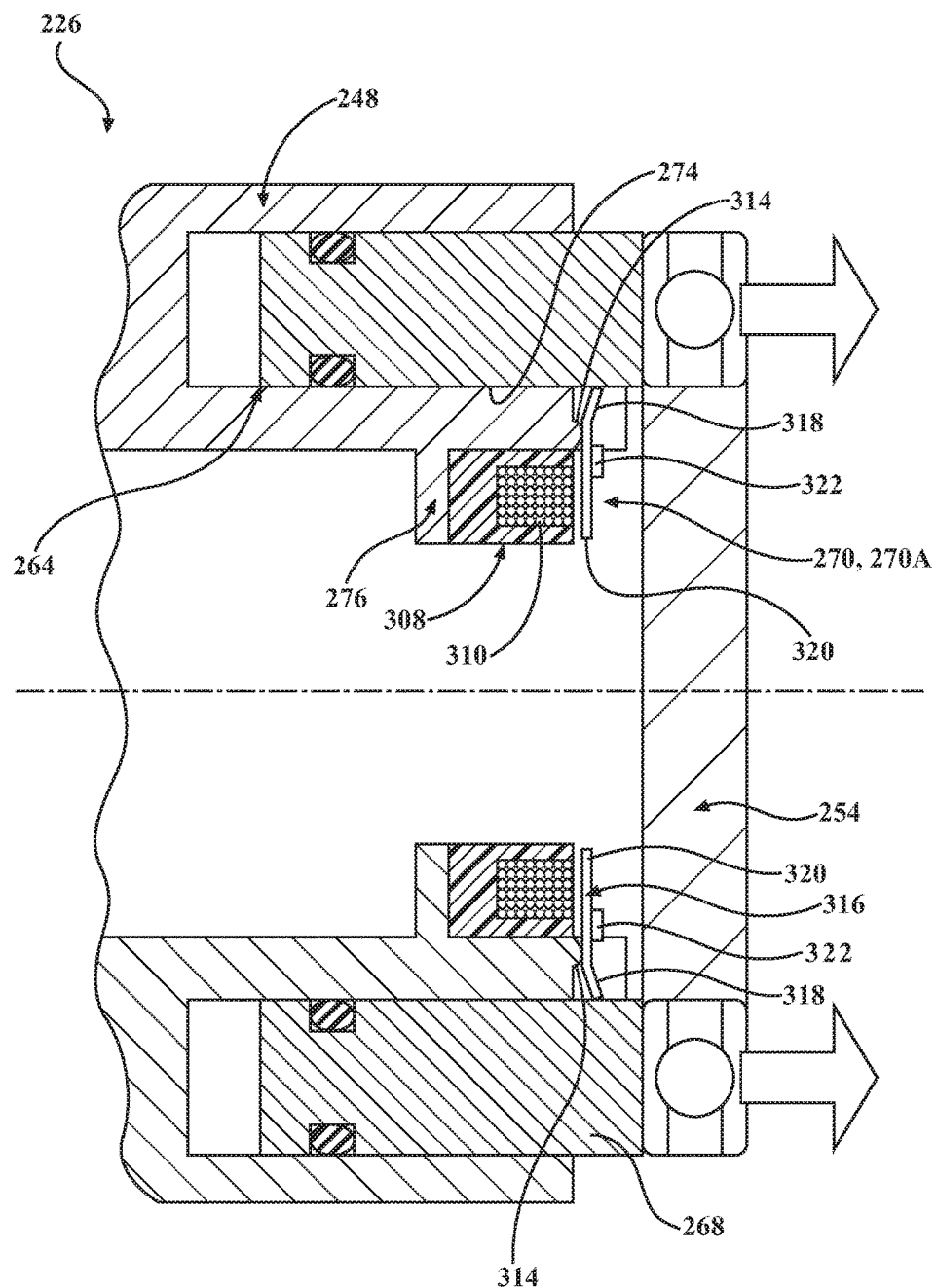
FIG. 6A is a diagrammatic representation of a portion of a transfer case with an actuator and lock mechanism in a locked configuration according to one embodiment of the present invention.
Figure 6B:
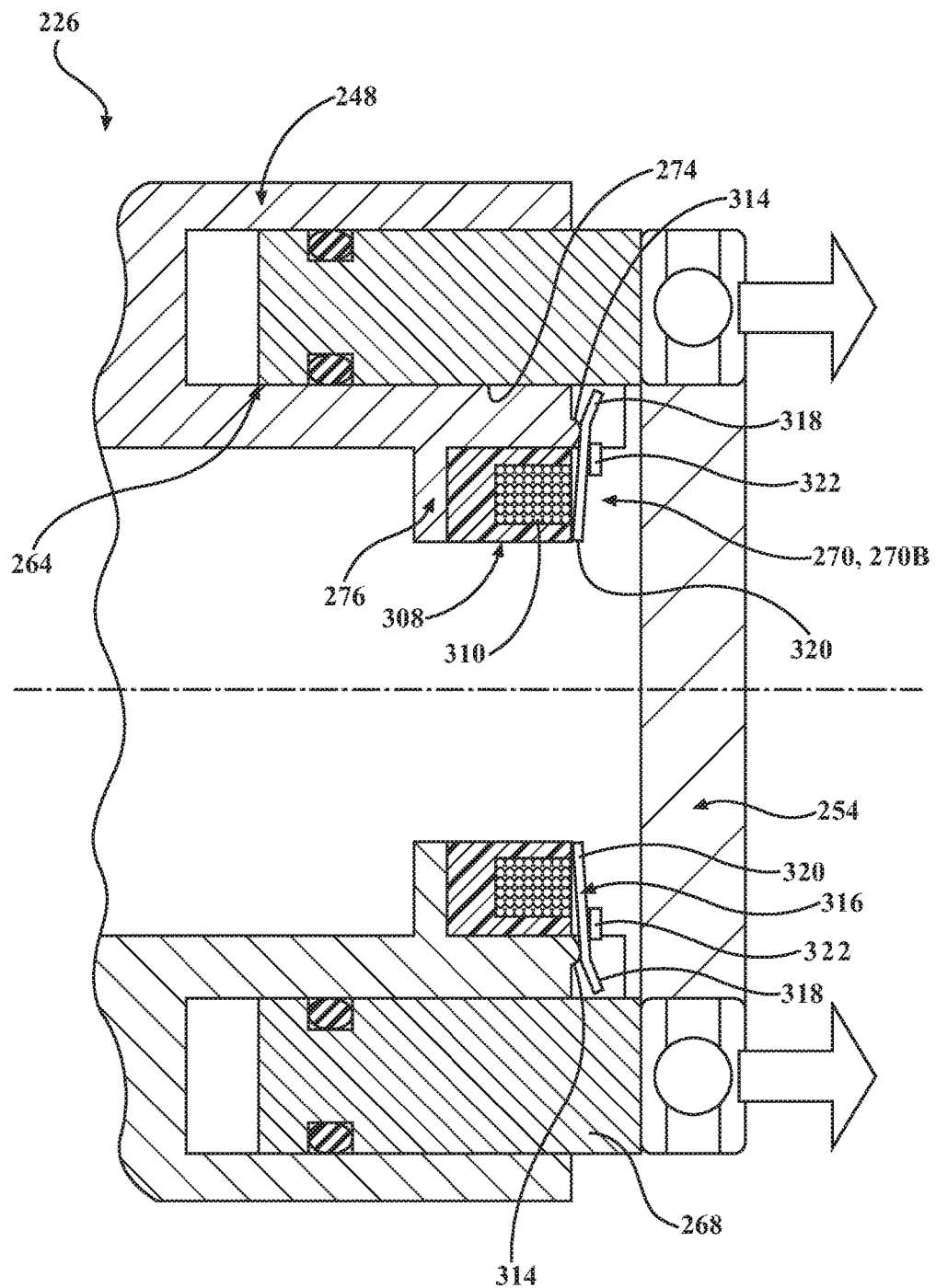
FIG. 6B is an alternate diagrammatic representation of the portion of the transfer case of FIG. 6A with the lock mechanism in an unlocked configuration.

As noted above, a third embodiment of the lock mechanism 70 of the transfer case 26 of the present invention is shown schematically in FIGS. 6A-6B. While specific differences between the embodiments will be described in greater detail below, in the description that follows, like components and structure of the third embodiment of the lock mechanism 70 and transfer case 26 are provided with the same reference numerals used in connection with the first embodiment increased by 200.

Referring now to FIGS. 6A-6B, the third embodiment of the lock mechanism 270 and transfer case 226 of the present invention is shown schematically. Similar to the second embodiment discussed above, in this embodiment, the piston 268 of the actuator 264 has a substantially annular profile, and an electromagnet 308 is utilized to move the lock mechanism 270 between configurations 270A, 270B so as to facilitate mode-stability of the clutch assembly 254. Here, the electromagnet 308 is operatively attached to a portion of the housing 248 disposed within the piston chamber 276, thereby further facilitating efficient component packaging and a reduced overall size of the transfer case 226. In this embodiment, the housing 248 includes an engagement surface 314 adjacent to the electromagnet 308 against which a diaphragm spring 316 engages. Here, the diaphragm spring 316 has: an outer edge portion 318 which abuts a portion of the inner piston surface 274 of the piston 268; and an inner edge portion 320 which cooperates with the electromagnet 308, as described in greater detail below. A retention ring 322 operatively attached to the housing 248 supports the diaphragm spring 316 so as to facilitate predetermined loading and unloading of the diaphragm spring 316 between the engagement surface 314 and the inner piston surface 274. When activated, such as by the controller 46, the electromagnet 308 moves the lock mechanism 270 from the locked configuration 270A (see FIG. 6A) to the unlocked configuration 270B (see FIG. 6B) so that the piston 268 can apply force (represented with arrows in FIGS. 6A-6B) to the clutch assembly 254 to move between positions, as described above in connection to the first embodiment. To that end, when the lock mechanism 270 is in the unlocked configuration 270B, magnetic forces generated by the electromagnet 308 urge the inner edge portion 320 of the diaphragm spring 316 toward the coil 310 which simultaneously loads the diaphragm spring 316 and urges the outer edge portion 318 from the inner piston surface 274 (see FIG. 6B). Here, when the outer edge portion 318 of the diaphragm spring 316 is urged from the inner piston surface 274, the piston 268 of the actuator 264 is released and can move the clutch assembly 254 between the positions 254A, 254B. Similarly, when the electromagnet 308 is deactivated such that the lock mechanism 270 is in the locked configuration 270A, stored energy in the diaphragm spring 316 is released and the outer edge portion 318 loads against the inner piston surface 274, thereby preventing the clutch assembly 254 from moving between the positions (see FIG. 6A).

In this way, the present invention significantly improves the performance of vehicle powertrain systems 10 by enabling simple, reliable, and space-efficient implementation of transfer case 26, 126, 226 mode-stability with hydraulically-actuated clutch assemblies 54, 154, 254. Specifically, those having ordinary skill in the art will appreciate that the lock mechanism 70, 170, 270 moves to the locked configuration 70A, 170A, 270A in an absence of electrical power, thereby ensuring proper and predictable powertrain functionality. Further, it will be appreciated that the present invention is configured such that the lock mechanism 70, 170, 270 maintains transfer case 26, 126, 226 mode stability irrespective of hydraulic bleed down of the clutch assembly 54, 154, 254. Further, the present invention can be used in connection with a number of different types of powertrain systems 10, and in a number of different ways. Further still, the present invention reduces the cost and complexity of manufacturing vehicles that have superior operational characteristics, such as high efficiency, reduced weight, component packaging, component life, and vehicle drivability.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A transfer case (26) for translating rotational torque from an engine (22) to first and second differentials (34, 36) of a vehicle, said transfer case (26) comprising:
   a housing (48);
   a primary shaft (50) rotatably supported in said housing (48) and having an input end (50A) in rotational communication with the engine (22) and an output end (50B) in rotational communication with the first differential (34);
   a secondary shaft (52) in rotational communication with the second differential (36);
   a clutch assembly (54) operatively connected between said primary shaft (50) and said secondary shaft (52) for selectively translating rotational torque therebetween, said clutch assembly (54) being selectively movable between a first position (54A) wherein rotational torque is translated to said secondary shaft (52), and a second position (54B) wherein rotational torque is interrupted to said secondary shaft (52);
   an actuator (64) having a cylinder (66) and a piston (68) movably supported in said cylinder (66), said piston (68) being disposed in force translating relationship with said clutch assembly (54) such that movement of said piston (68) along said cylinder (66) causes corresponding movement of said clutch assembly (54) between said first position (54A) and said second position (54B); and
   a lock mechanism (70) selectively movable between a locked configuration (70A) wherein said lock mechanism (70) engages said piston (68) and prevents movement of said piston (68) along said cylinder (66) thereby preventing movement of said clutch assembly (54) between said first position (54A) and said second position (54B), and an unlocked configuration (70B) wherein said lock mechanism (70) releases said piston (68) thereby allowing said piston (68) to move said clutch assembly (54) between said first position (54A) and said second position (54B).

2. The transfer case (26) as set forth in claim 1, wherein said cylinder (66) of said actuator (64) is defined in said housing (48) adjacent to said clutch assembly (54).

3. The transfer case (26) as set forth in claim 1, wherein said piston (68) of said actuator (64) has a substantially tube-shaped profile with an outer piston surface (72) and an inner piston surface (74) spaced from said outer piston surface (72).

4. The transfer case (26) as set forth in claim 3, wherein said inner surface (74) of said piston (68) defines a piston chamber (76), and wherein said primary shaft (50) extends at least partially into said piston chamber (76).

5. The transfer case (26) as set forth in claim 1, wherein said lock mechanism (70) further includes a pawl (92) having a cam portion (94), said cam portion (94) at least partially engaging said piston (68) of said actuator (64) when said lock mechanism (70) is in said locked configuration (70A) so as to prevent movement of said piston (68) along said cylinder (66).

6. The transfer case (26) as set forth in claim 5, wherein said cam portion (94) has a high point (96) and a low point (98), said high point (96) engaging said piston (68) of said actuator (64) only when said lock mechanism (70) is in said locked configuration (70A).

7. The transfer case (26) as set forth in claim 5, wherein said pawl (92) is pivotally attached to said housing (48).

8. The transfer case (26) as set forth in claim 5, wherein said pawl (92) further includes a lever portion (100) extending from said cam portion (94), and wherein said lock mechanism (70) further includes a solenoid (104) coupled to said lever portion (100) for selectively translating force to said pawl (92) so as to move said lock mechanism (70) between said configurations (70A, 70B).

9. The transfer case (26) as set forth in claim 8, further including a controller (46) in electrical communication with said solenoid (104) for selectively actuating said solenoid (104) so as to move said lock mechanism (70) between said configurations (70A, 70B).

10. The transfer case (26) as set forth in claim 8, further including a biasing mechanism (106) supported in said housing (48) for urging said lever portion (100) away from said solenoid (104) when said lock mechanism (70) is in said locked configuration (70A).

11. The transfer case (26) as set forth in claim 10, wherein said biasing mechanism (106) includes at least one compression spring operatively attached to said lever portion (100).

12. The transfer case (26) as set forth in claim 1, including a plurality of lock mechanisms (70) that cooperate so as to selectively hold said piston (68) of said actuator (64) and thereby prevent said clutch assembly (54) from moving between said first position (54A) and said second position (54B) when said lock mechanism (70) is in said locked configuration (70A).

13. The transfer case (26) as set forth in claim 12, wherein said lock mechanisms (70) are radially spaced about said primary shaft (50).

14. The transfer case (26) as set forth in claim 12, wherein said lock mechanisms (70) are equally spaced from each other.

15. The transfer case (26) as set forth in claim 1, wherein said piston (68) of said actuator (64) holds said clutch assembly (54) in a locked position (54C) defined between said first position (54A) and said second position (54B) when said lock mechanism (70) is in said locked configuration (70A).

16. The transfer case (26) as set forth in claim 1, further including a pump assembly (86) for providing a source of fluid power to said actuator (64) such that said cylinder (66) is disposed in selective fluid communication with said pump assembly (86) for moving said piston (68) of said actuator (64) along said cylinder (66) so as to correspondingly move said clutch assembly (54) between said first position (54A) and said second position (54B).

17. The transfer case (26) as set forth in claim 16, further including a control valve (90) interposed in fluid communication between said cylinder (66) of said actuator (64) and said pump assembly (86) for selectively directing pressurized hydraulic fluid from said pump assembly (86) to said cylinder (66).

* * * * *